United States Patent
Paul

(10) Patent No.: US 11,270,067 B1
(45) Date of Patent: Mar. 8, 2022

(54) STRUCTURED ACTIVITY TEMPLATES FOR SOCIAL MEDIA CONTENT

(71) Applicant: Snap Inc., Santa Monica, CA (US)

(72) Inventor: Zachary Paul, Santa Monica, CA (US)

(73) Assignee: Snap Inc., Santa Monica, CA (US)

( * ) Notice: Subject to any disclaimer, the term of this patent is extended or adjusted under 35 U.S.C. 154(b) by 97 days.

(21) Appl. No.: 16/232,761

(22) Filed: Dec. 26, 2018

(51) Int. Cl.
  *G06F 9/451* (2018.01)
  *G06F 40/186* (2020.01)
  *G06Q 30/02* (2012.01)

(52) U.S. Cl.
  CPC ............ *G06F 40/186* (2020.01); *G06F 9/451* (2018.02); *G06Q 30/0236* (2013.01)

(58) Field of Classification Search
  CPC ...... G06F 9/451; G06F 40/166; G06F 40/186; G06F 16/739; G06F 16/78; G06F 16/958; G06F 9/452; G06Q 30/0236
  See application file for complete search history.

(56) References Cited

U.S. PATENT DOCUMENTS

| | | | | |
|---|---|---|---|---|
| 6,438,579 B1 * | 8/2002 | Hosken | ............... | G06Q 30/02 709/203 |
| 7,062,679 B2 * | 6/2006 | Yoshii | ............... | G06F 11/0715 714/37 |
| 8,606,247 B2 * | 12/2013 | Pousti | ............... | G06Q 30/04 455/408 |
| 9,058,580 B1 * | 6/2015 | Amtrup | ............ | G06Q 10/06316 |
| 9,081,777 B1 * | 7/2015 | Krawczyk | ............... | G06F 16/41 |
| 9,342,597 B1 * | 5/2016 | Tomkins | .................. | H04L 51/22 |
| 9,507,836 B1 * | 11/2016 | Tomkins | .............. | G06F 16/3331 |
| 9,552,334 B1 * | 1/2017 | Meisels | .................. | G06Q 50/01 |
| 9,868,056 B2 * | 1/2018 | Kehoe | ..................... | A63F 13/23 |
| 9,998,796 B1 * | 6/2018 | Kedenburg, III | .... | H04N 21/482 |
| 10,490,092 B2 * | 11/2019 | Dohring | .................. | G09B 5/08 |

(Continued)

OTHER PUBLICATIONS

"Surprise!", [Online] Retrieved from the Internet: <URL: https://www.snap.com/en-US/news/post/surprises, (Oct. 3, 2013), 1 pg.

(Continued)

*Primary Examiner* — Phenuel S Salomon
(74) *Attorney, Agent, or Firm* — Schwegman Lundberg & Woessner, P.A.

(57) ABSTRACT

Aspects of the present disclosure involve a system comprising a computer-readable storage medium storing a program and method for detecting an activity associated with a user, wherein the activity includes a plurality of sequential phases; identifying a media template associated with the activity, wherein the media template includes a plurality of phase identifiers each associated with a respective phase of the plurality of phases of the activity; capturing a plurality of media items that represents each of the plurality of phases, each media item of the plurality of media items being captured when a corresponding one of the plurality of phases is in progress; associating the plurality of media items with respective phase identifiers of the plurality of phase identifiers of the media template based on the phase associated with each of the plurality of phase identifiers; and generating a display of the plurality of media items based on the media template that includes the plurality of phase identifiers associated with the plurality of media items.

20 Claims, 10 Drawing Sheets

(56) References Cited

U.S. PATENT DOCUMENTS

| | | | |
|---|---|---|---|
| 2002/0092019 A1* | 7/2002 | Marcus | G11B 27/034 725/37 |
| 2004/0162849 A1* | 8/2004 | Kumpitsch | G06F 16/958 |
| 2006/0159109 A1* | 7/2006 | Lamkin | G11B 27/10 370/401 |
| 2006/0161635 A1* | 7/2006 | Lamkin | G06F 16/4387 709/217 |
| 2006/0242018 A1* | 10/2006 | Shulman | G06Q 30/02 705/14.16 |
| 2007/0027931 A1* | 2/2007 | Heckenbach | G06F 16/907 |
| 2007/0038963 A1* | 2/2007 | Moore | G05B 23/0267 715/859 |
| 2007/0260523 A1* | 11/2007 | Schadt | G06Q 30/0235 705/14.16 |
| 2007/0268280 A1* | 11/2007 | Fujita | G16H 15/00 345/204 |
| 2007/0288478 A1* | 12/2007 | DiMaria | G06F 16/68 |
| 2007/0299713 A1* | 12/2007 | Macbeth | G06Q 10/063114 705/7.15 |
| 2008/0120129 A1* | 5/2008 | Seubert | G06Q 10/06 705/35 |
| 2008/0232885 A1* | 9/2008 | Mock | G06Q 10/10 400/76 |
| 2009/0048881 A1* | 2/2009 | Keane | G06Q 10/06 717/101 |
| 2009/0249195 A1* | 10/2009 | Angell | G06F 40/166 715/243 |
| 2009/0259654 A1* | 10/2009 | Yamamoto | G06F 16/20 |
| 2010/0070527 A1* | 3/2010 | Chen | G06F 16/70 |
| 2010/0179856 A1* | 7/2010 | Paretti | G06Q 30/02 705/14.1 |
| 2010/0312464 A1* | 12/2010 | Fitzgerald | G06Q 10/047 701/532 |
| 2011/0060807 A1* | 3/2011 | Martin | H04L 67/325 709/217 |
| 2011/0060808 A1* | 3/2011 | Martin | G06F 16/9537 709/217 |
| 2011/0071865 A1* | 3/2011 | Leeds | G06Q 10/025 705/6 |
| 2011/0167357 A1* | 7/2011 | Benjamin | H04M 1/72457 715/753 |
| 2011/0185015 A1* | 7/2011 | Stolper | G06Q 30/02 709/203 |
| 2012/0143963 A1* | 6/2012 | Kennberg | H04L 51/26 709/206 |
| 2012/0159337 A1* | 6/2012 | Travilla | G06Q 30/0631 715/738 |
| 2012/0166367 A1* | 6/2012 | Murdock | H04L 51/046 706/12 |
| 2012/0194579 A1* | 8/2012 | Fujinaga | G06K 15/1823 347/5 |
| 2012/0301865 A1* | 11/2012 | Taylor | G09B 3/00 434/365 |
| 2013/0144847 A1* | 6/2013 | Spurlock | G06F 16/955 707/692 |
| 2013/0145024 A1* | 6/2013 | Cao | H04L 67/22 709/224 |
| 2013/0190903 A1* | 7/2013 | Balakrishnan | A61B 5/0004 700/91 |
| 2013/0198204 A1* | 8/2013 | Williams | G06F 16/951 707/748 |
| 2013/0203383 A1* | 8/2013 | Stopel | H04W 12/08 455/411 |
| 2013/0325954 A1* | 12/2013 | Cupala | G06F 3/048 709/204 |
| 2014/0096061 A1* | 4/2014 | Olson | G06Q 10/06 715/772 |
| 2014/0108066 A1* | 4/2014 | Lam | G06Q 10/02 705/5 |
| 2014/0108946 A1* | 4/2014 | Olofsson | G06F 3/0482 715/739 |
| 2014/0122471 A1* | 5/2014 | Houston | G06F 16/958 707/731 |
| 2014/0172863 A1* | 6/2014 | Imbruce | G06F 40/106 707/740 |
| 2014/0187315 A1* | 7/2014 | Perry | A63F 13/12 463/29 |
| 2014/0236916 A1* | 8/2014 | Barrington | G06Q 10/10 707/706 |
| 2014/0281929 A1* | 9/2014 | Grossman | H04N 21/25816 715/243 |
| 2014/0282016 A1* | 9/2014 | Hosier, Jr. | H04W 4/08 715/733 |
| 2014/0310079 A1* | 10/2014 | Girard | G06Q 30/00 705/14.16 |
| 2014/0328570 A1* | 11/2014 | Cheng | H04N 21/44008 386/241 |
| 2014/0379402 A1* | 12/2014 | DeSalle, Jr. | G06Q 50/01 705/7.18 |
| 2015/0046298 A1* | 2/2015 | Zwakhals | G06Q 10/087 705/28 |
| 2015/0082224 A1* | 3/2015 | Hathaway | G06F 9/451 715/771 |
| 2015/0134378 A1* | 5/2015 | Van Doren | G06Q 50/14 705/6 |
| 2015/0242091 A1* | 8/2015 | Lu | G06Q 10/10 715/708 |
| 2015/0242927 A1* | 8/2015 | Will | G06Q 30/0629 705/26.64 |
| 2015/0324099 A1* | 11/2015 | Tang | G06F 3/04842 715/716 |
| 2016/0026874 A1* | 1/2016 | Hodulik | H04N 5/77 386/281 |
| 2016/0055381 A1* | 2/2016 | Adsumilli | G06K 9/00751 386/241 |
| 2016/0104202 A1* | 4/2016 | Greenberg | G06F 3/0482 705/14.64 |
| 2016/0149956 A1* | 5/2016 | Birnbaum | H04L 63/101 726/1 |
| 2016/0179846 A1* | 6/2016 | Tobita | G06K 9/6218 382/305 |
| 2017/0351922 A1* | 12/2017 | Campbell | G06K 9/00765 |
| 2018/0027272 A1* | 1/2018 | Raj | H04N 21/422 725/34 |
| 2018/0046944 A1* | 2/2018 | Barbera | G06F 3/0482 |
| 2018/0095944 A1* | 4/2018 | Akkarawittayapoom | H04L 67/306 |
| 2018/0096310 A1* | 4/2018 | Skalicky | G06Q 10/1097 |
| 2019/0065613 A1* | 2/2019 | Bilsten | G06F 16/48 |
| 2019/0087915 A1* | 3/2019 | DeLuca | G06Q 30/0631 |

OTHER PUBLICATIONS

Buscemi, Scott, "Snapchat introduces 'Stories', a narrative built with snaps", [Online] Retrieved from the Internet: <URL: https://9to5mac.com/2013/10/03/snapchat-introduces-stories-a-narrative-built-with-snaps/>, (Oct. 3, 2013), 2 pgs.

Etherington, Darrell, "Snapchat Gets Its Own Timeline With Snapchat Stories, 24-Hour Photo & Video Tales", [Online] Retrieved from the Internet: <URL: https://techcrunch.com/2013/10/03/snapchat-gets-its-own-timeline-with-snapchat-stories-24-hour-photo-video-tales/>, (Oct. 3, 2013), 2 pgs.

Hamburger, Ellis, "Snapchat's next big thing: 'Stories' that don't just disappear", [Online] Retrieved from the Internet: <URL: https://www.theverge.com/2013/10/3/4791934/snapchats-next-big-thing-stories-that-dont-just-disappear>, (Oct. 3, 2013), 5 pgs.

* cited by examiner ional digit or digits in a reference number refer to the figure number in which that element is first introduced. Some embodiments are illustrated by way of example, and not limitation, in the figures of the accompanying drawings.
STRUCTURED ACTIVITY TEMPLATES FOR SOCIAL MEDIA CONTENT

TECHNICAL FIELD

The present disclosure relates generally to organizing media content.

BACKGROUND

Users are always seeking new ways to share their experiences with their friends. Modern-day systems allow users to quickly share pictures or videos of their daily routines with each other. However, these pictures and videos often lack any sort of organization and consistency, making them difficult to catalog, track, and compare.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings.

DETAILED DESCRIPTION

Figure 1:
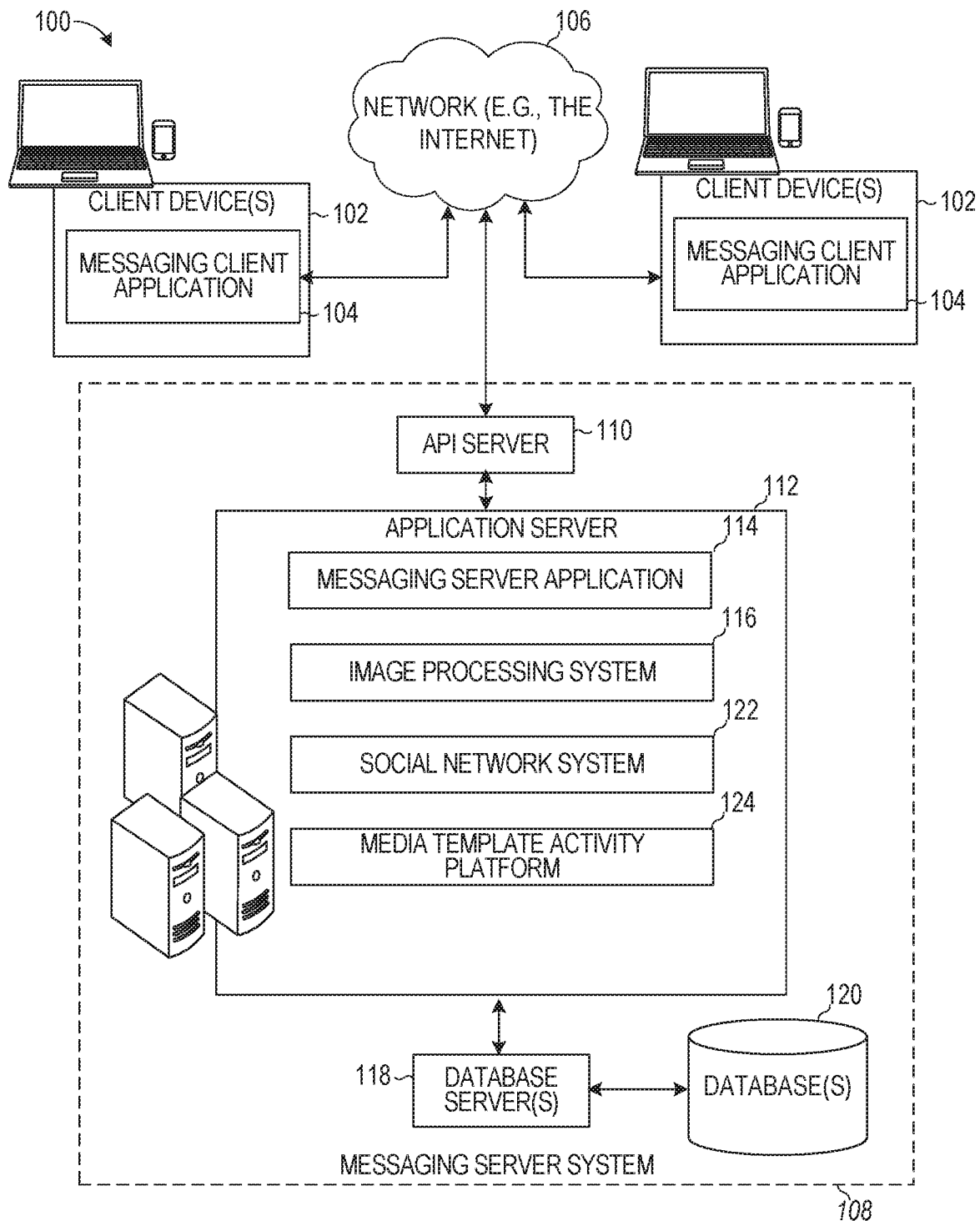
FIG. 1 is a block diagram showing an example messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Typical social networking systems allow users to exchange pictures and videos with each other. Users typically manually create an album that includes the collection of pictures and videos and share that album with other users. However, creating the albums takes a great deal of time, and sometimes pictures and videos in the album itself lack any sort of organization or structure. Also, creating the album requires users to remember to capture particular moments associated with a given routine which are oftentimes missed. This all results in a poor overall user experience and poor-quality albums.

In particular, conventional user interfaces have many deficits relating to the efficient functioning of the computer, requiring a user to manually page through various media the user captured and select a particular set of media to add to an album. After the media has been added to the album, the user has to then page through the media added to the album to organize the media in a coherent way. This leaves the user having to navigate many more screens to find and organize media in an album, resulting in a poor user experience and reduced efficiency. This conventional process of creating an album that includes a collection of media could seem slow, complex, and difficult to learn and use. The disclosed embodiments improve the efficiency of using an electronic device (e.g., a computer) by automatically reminding the user to capture media when an activity is in progress and automatically placing that media in an organized and structured manner in an album which can then be accessed and shared with other users.

The disclosed embodiments streamline the process for the user to capture media items and generate an album for a given activity by automatically creating a media template and reminding a user to add media items to the template as a user performs a given activity. "Media item," as used herein, means an item including photographic or video content. Example media items include digital photographs or images, video clips, and social media messages comprising photographic or video content augmented with text, graphic overlays, or the like. Specifically, according to the disclosed techniques, an activity associated with a user is detected. For example, a user can specify that the user is traveling to a particular destination. A media template associated with that activity is identified that includes various media identifiers associated with different phases of the activity. For example, the media template can include an identifier for a packing phase of the traveling activity, an identifier for a flying phase of the activity, and an identifier for an arrival phase of the activity. As each activity phase is in progress, the identifier of the activity is used to remind the user to capture media items (e.g., a video and/or image) that represent the activity. Using the media template, the captured media items are organized in a predetermined manner (e.g., in sequence according to the phases of the activity) and interactively presented to the user, allowing the user to share the organized media items with others.

This significantly improves the user experience, reduces the amount of time users spend searching for pictures or videos when creating albums, and reduces the number of steps a user has to perform to share experiences using an album with other users, which makes communicating with other users more enjoyable. This is because the user can simply indicate which activity the user is performing and easily add pictures associated with the activity as the activity is being performed without having to later search for and open up different interfaces to find a media item associated with the activity to manually create an album. Rather than paging through multiple screens of pictures and videos and selecting pictures or videos of interest to add to an album, the user may need only a few steps from a conversation interface to create an organized representation of media items associated with an activity. This significantly helps the user capture and share media items representing the activity with their friends. The enclosed embodiments also enable a semi-automated (e.g., automated activity template selection and provision combined with user-selected population of slots in the templates) structured contextualization of media items, which in a social media environment allows other users to readily identify the context of different media items in a multi-phase activity.

FIG. 1 is a block diagram showing an example messaging system 100 for exchanging data (e.g., messages and associated content) over a network 106. The messaging system 100 includes multiple client devices 102, each of which hosts a number of applications including a messaging client application 104. Each messaging client application 104 is communicatively coupled to other instances of the messaging client application 104 and a messaging server system 108 via the network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video, or other multimedia data).

Each messaging client application 104 is able to communicate and exchange data with a media template activity platform 124. Utilizing the media template activity platform 124, the messaging client application 104 can automatically generate albums representing an activity performed by a user. For example, the messaging client application 104 retrieves from the media template activity platform 124 a list of available activities. The messaging client application 104 presents the list to a user. The list may identify a set of activities for which the media template activity platform 124 has an associated media template.

For example, the list may include any one or more of the following activities; traveling; dining out with friends; attending a sporting event, a concert, a show, a musical, or a play; celebrating a holiday; and so forth. Each activity includes one or more phases. A phase of an activity represents a segment of the activity that has a defined start point and a defined end point of an event within the activity. Specifically, each activity phase is a distinct period or stage forming part of the activity. For example, a traveling activity includes several phases in sequence: 1) packing for the trip, 2) taking the trip, which may itself include one or more phases (e.g., traveling by cab from home to the airport and then flying), 3) boarding a plane, and 4) arriving (or landing) at the destination. As another example, a dining out with friends activity includes several sequential phases: 1) getting dressed or ready to leave the house, 2) arriving at the restaurant or establishment, 3) talking to the maître d', 4) being seated at the table, 5) eating food, and 6) going home. As another example, attending a sporting event includes several sequential phases: 1) getting dressed or ready to leave, 2) arriving at the stadium or location of the event, 3) attending a tailgate party at a parking lot of the stadium or location of the event, 4) sitting down to watch the event in the stadium or location of the event, and 5) seeing the team win or lose the sporting event.

After the user selects a given activity from the list using the messaging client application 104, the messaging client application 104 retrieves from the media template activity platform 124 the media template associated with the selected activity. For example, the media template activity platform 124 stores several templates, each associated with a different activity. The template includes a list of phase (or media) identifiers, each associated with a different phase of the activity. The phase identifiers may include labels or representations of the particular phase associated with the identifier. The messaging client application 104 presents the retrieved template to the user of the client device 102. For example, the messaging client application 104 presents a grid showing the sequential arrangement of placeholders associated with each phase identifier in the template.

As the user performs each phase of the selected activity or as the messaging client application 104 detects that a particular phase of the selected activity is in progress, the messaging client application 104 notifies the user to capture media items representing the phase of the selected activity. The notification can be generated by retrieving the identifier from the template associated with the phase of the activity and presenting the identifier to the user. For example, if the selected activity is traveling and the phase in progress is packing, the messaging client application 104 presents a prompt visually or verbally for the user to take a picture or video of the suitcase with the user's clothing that is being packed for the trip. The captured media is stored and associated with the identifier of the phase. After all the identifiers of the template (or a predetermined number of identifiers) are associated with media representing each phase (or a predetermined number of phases) of the activity, the messaging client application 104 presents to the user an album that has all of the captured media organized in a sequence according to the sequence of the identifiers in the template. The user can then select an option to share the album with other users or maintain the album in storage associated with the user.

In some embodiments, the messaging client application 104 incentivizes the user to capture media items representing each phase of the activity using a reward system. For example, as each media item representing a phase of an activity is captured, the user's score is incremented. When the user reaches a particular predetermined score, the user can be rewarded. For example, a discount or coupon is provided to the user to allow the user to select one or more options of the messaging client application 104 that cost money. Specifically, the user can purchase a new avatar or features (e.g., clothing) of an avatar at a lower cost when the user's score reaches a predetermined level.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality within either the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, virtual objects, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an application programming interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this API server 110 receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video or albums) from a messaging client application 104 to a messaging server application 114, for possible access by another messaging client application 104; the setting of a collection of media data (e.g., story or album); the retrieval of such collections; the retrieval of a list of friends of a user of a client device 102; the retrieval of messages and content; the adding of friends to and deleting of friends from a social graph; the location of friends within a social graph; access to user conversation data; access to avatar information stored on the messaging server system 108; and opening an application event (e.g., relating to the messaging client application 104).

The application server 112 hosts a number of applications and subsystems, including the messaging server application 114, an image processing system 116, a social network system 122, and the media template activity platform 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called albums, stories, or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes the image processing system 116, which is dedicated to performing various image processing operations, typically with respect to images or video received within the payload of a message at the messaging server application 114.

The social network system 122 supports various social networking functions and services and makes these functions and services available to the messaging server application 114. To this end, the social network system 122 maintains and accesses an entity graph within the database 120. Examples of functions and services supported by the social network system 122 include the identification of other users of the messaging system 100 with whom a particular user has relationships or whom the particular user is "following," and also the identification of other entities and interests of a particular user. Such other users may be referred to as the user's friends.

Figure 2:
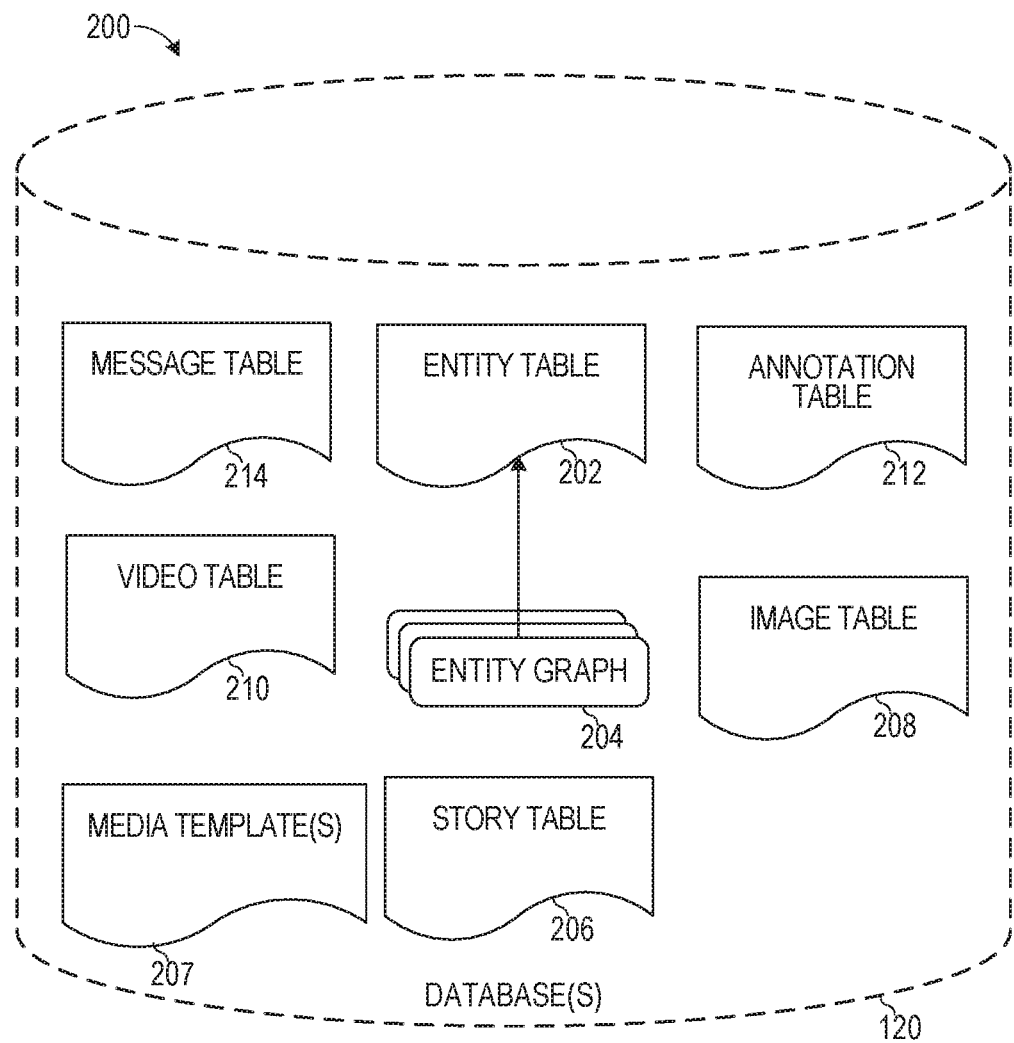
FIG. 2 is a schematic diagram illustrating data which may be stored in the database of a messaging server system, according to example embodiments.

FIG. 2 is a schematic diagram 200 illustrating data, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 214. An entity table 202 stores entity data, including an entity graph 204. Entities for which records are maintained within the entity table 202 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 204 furthermore stores information regarding relationships and associations between entities. Such relationships may be social, professional (e.g., work at a common corporation or organization), interest-based, or activity-based, merely for example.

The message table 214 may store a collection of conversations between a user and one or more friends or entities. The message table 214 may include various attributes of each conversation, such as the list of participants, the size of the conversation (e.g., number of users and/or number of messages), the chat color of the conversation, a unique identifier for the conversation, and any other conversation-related feature(s). Information from the message table 214 may be provided in limited form and on a limited basis to a given web-based gaming application based on functions of the messaging client application 104 invoked by the web-based gaming application.

The database 120 also stores annotation data, in the example form of filters, in an annotation table 212. The database 120 also stores annotated content received in the annotation table 212. Filters for which data is stored within the annotation table 212 are associated with and applied to videos (for which data is stored in a video table 210) and/or images (for which data is stored in an image table 208). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a UI by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include a current temperature at a specific location, a current speed at which a sending user is traveling, battery life for a client device 102, or the current time.

Other annotation data that may be stored within the annotation table 212 is so-called "lens" data. A "lens" may be a real-time special effect and sound that may be added to an image or a video.

As mentioned above, the video table 210 stores video data which, in one embodiment, is associated with messages for which records are maintained within the message table 214. Similarly, the image table 208 stores image data associated with messages for which message data is stored in the message table 214. The entity table 202 may associate various annotations from the annotation table 212 with various images and videos stored in the image table 208 and the video table 210.

One or more media templates 207 (also referred to as media templates which may be stored in a table or database) include one or more media activity templates utilized by the media template activity platform 124. As discussed above, each media template includes a plurality of identifiers of one or more phases of an activity. For example, a first media activity template stored in the media template(s) 207 is associated with a travel activity. The travel activity may include three distinct phases: 1) packing, 2) taking the trip, which may itself include one or more phases (e.g., traveling by cab from home to the airport and then flying), and 3) arriving at the destination. Accordingly, the first media activity template includes three phase identifiers (e.g., a first identifier for the packing phase, a second identifier for the taking the trip phase, and a third identifier for the arriving at the destination phase). Each phase identifier may uniquely label and represent the phase with which it is associated. In an implementation, the phase identifiers are arranged in a sequence according to the sequence of the phases. In an implementation, the phase identifiers include placeholder cells that are to be populated with media items captured by a given user device.

In some embodiments, new media activity templates are added to the media template(s) 207 over time. Such templates may be added by taking a majority vote among various users. For example, a first user provides an identifier of a new activity and a first set of phase identifiers of the phases of that activity. A second user provides a phase identifier of the same new activity and a second set of identifiers of the phases of that activity. A third user provides an identifier of the same new activity and a third set of phase identifiers of the phases of that activity. The media template activity platform 124 processes these phase identifiers for the new activity received from the three users to generate a new media template to be added to the media template(s) 207. For example, the media template activity platform 124 determines that the first and third users each have the same three phase identifiers of phases of the activity in their respective first and third sets of phase identifiers. In response to this determination, the media template activity platform 124 determines that the majority of users selected the three identifiers of the phases and automatically generates a new media activity template that includes the three phase identifiers. In some implementations, an editor or curator at the media template activity platform 124 reviews the new media activity template to organize the phase identifiers and/or add more phase identifiers of phases to the media activity template. After the editor or curator reviews the new media activity template, the new template is stored in the media template(s) 207 for access by other users of the messaging client application 104.

A story table 206 stores data regarding collections of messages and associated image, video, or audio data, which are compiled into a collection (e.g., a story, or a gallery or album). In some embodiments, media is stored in the story table 206 according to the sequence of identifiers of phases stored in the media template(s) 207. The creation of a particular collection may be initiated by a particular user (e.g., each user for whom a record is maintained in the entity table 202). A user may create a "personal story" in the form of a collection of content that has been created and sent/broadcast by that user. To this end, the UI of the messaging client application 104 may include an icon that is user-selectable to enable a sending user to add specific content to his or her personal story. The UI of the messaging client application 104 may include selectable options to enable a sending user to add a modified video clip that has a virtual object to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a UI of the messaging client application 104, to contribute content to a particular live story. The live story may be identified to the user by the messaging client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 3:
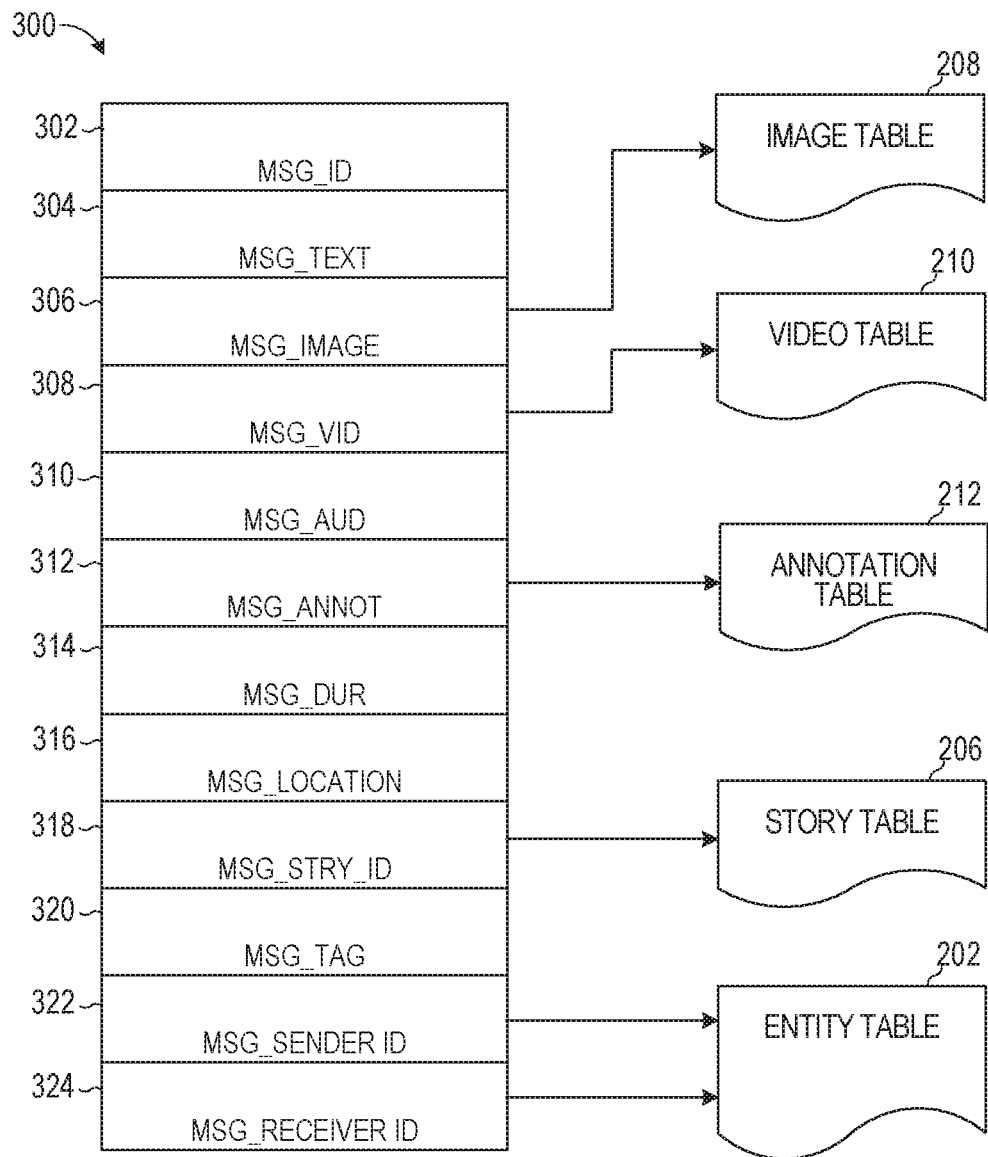
FIG. 3 is a schematic diagram illustrating a structure of a message generated by a messaging client application for communication, according to example embodiments.

FIG. 3 is a schematic diagram illustrating a structure of a message 300, according to some embodiments, generated by a messaging client application 104 for communication to a further messaging client application 104 or the messaging server application 114. The content of a particular message 300 is used to populate the message table 214 stored within the database 120, accessible by the messaging server application 114. Similarly, the content of a message 300 is stored in memory as "in-transit" or "in-flight" data of the client device 102 or the application server 112. The message 300 is shown to include the following components:

A message identifier 302: a unique identifier that identifies the message 300.

A message text payload 304: text, to be generated by a user via a UI of the client device 102 and that is included in the message 300.

A message image payload 306: image data, captured by a camera component of a client device 102 or retrieved from memory of a client device 102, and that is included in the message 300.

A message video payload 308: video data, captured by a camera component or retrieved from a memory component of the client device 102 and that is included in the message 300.

A message audio payload 310: audio data, captured by a microphone or retrieved from the memory component of the client device 102, and that is included in the message 300.

Message annotations 312: annotation data (e.g., filters, stickers, or other enhancements) that represents annotations to be applied to the message image payload 306, message video payload 308, or message audio payload 310 of the message 300.

A message duration parameter 314: a parameter value indicating, in seconds, the amount of time for which content of the message 300 (e.g., the message image payload 306, message video payload 308, and message audio payload 310) is to be presented or made accessible to a user via the messaging client application 104.

A message geolocation parameter 316: geolocation data (e.g., latitudinal and longitudinal coordinates) associated with the content payload of the message 300. Multiple message geolocation parameter 316 values may be included in the payload, with each of these parameter values being associated with respective content items included in the content (e.g., a specific image within the message image payload 306, or a specific video in the message video payload 308).

A message story identifier 318: an identifier value identifying one or more content collections (e.g., "stories") with which a particular content item in the message image payload 306 of the message 300 is associated. For example, multiple images within the message image payload 306 may each be associated with multiple content collections using identifier values.

A message tag 320: a tag value associated with the message 300. Each message 300 may be tagged with multiple tags, each of which is indicative of the subject matter of content included in the message payload. For example, where a particular image included in the message image payload 306 depicts an animal (e.g., a lion), a tag value may be included within the message tag 320 that is indicative of the relevant animal. Tag values may be generated manually, based on user input, or may be automatically generated using, for example, image recognition.

A message sender identifier 322: an identifier (e.g., a messaging system identifier, email address, or device identifier) indicative of a user of the client device 102 on which the message 300 was generated and from which the message 300 was sent.

A message receiver identifier 324: an identifier (e.g., a messaging system identifier, email address, or device identifier) indicative of one or more users of the client device 102 to which the message 300 is addressed. In the case of a conversation between multiple users, the identifier may indicate each user involved in the conversation.

The contents (e.g., values) of the various components of the message 300 may be pointers to locations in tables within which content data values are stored. For example, an image value in the message image payload 306 may be a pointer to (or address of) a location within an image table 208. Similarly, values within the message video payload 308 may point to data stored within a video table 210, values stored within the message annotations 312 may point to data stored in an annotation table 212, values stored within the message story identifier 318 may point to data stored in a story table 206, and values stored within the message sender identifier 322 and the message receiver identifier 324 may point to user records stored within an entity table 202.

Figure 4:
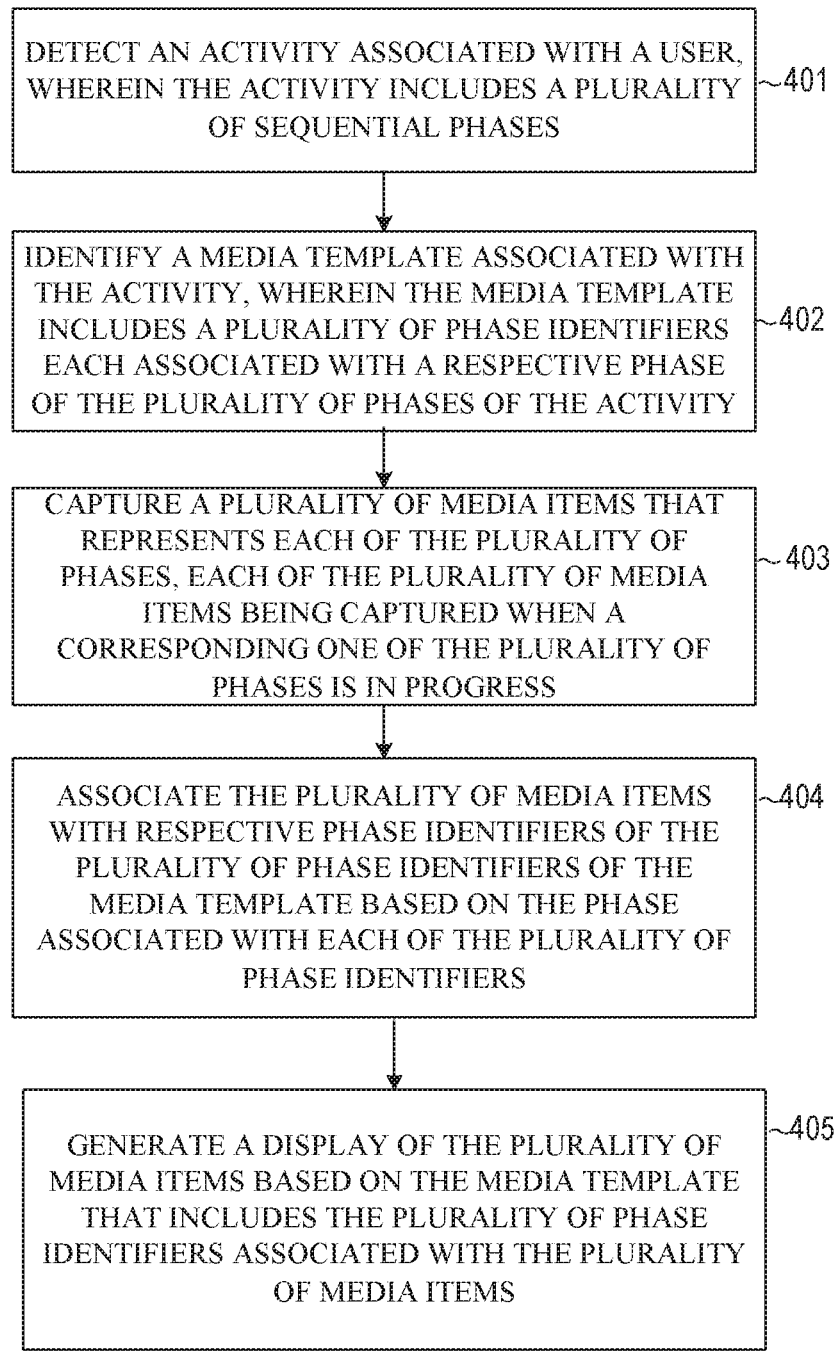
FIG. 4 is a flowchart illustrating example operations of a media template activity platform, according to example embodiments.

FIG. 4 is a flowchart illustrating example operations of the media template activity platform 124 in performing a process 400, according to example embodiments. The process 400 may be embodied in computer-readable instructions for execution by one or more processors such that the operations of the process 400 may be performed in part or in whole by the functional components of the messaging server system 108; accordingly, the process 400 is described below by way of example with reference thereto. However, in other embodiments, at least some of the operations of the process 400 may be deployed on various other hardware configurations. The process 400 is therefore not intended to be limited to the messaging server system 108 and can be implemented in whole, or in part, by any other component.

At operation 401, the media template activity platform 124 (e.g., using the client device 102 or the application server 112) detects an activity associated with a user, wherein the activity includes a plurality of sequential phases. For example, the media template activity platform 124 provides a list of available activities to the client device 102. The client device 102 presents the list of activities to the user. The client device 102 receives a user selection of a given activity from the list. The selection may be received a predetermined time before the user begins performing the activity or after the user starts performing the activity.

In some implementations, the list of available activities is filtered for or tailored to a particular user based on a current location of the user. For example, the media template activity platform 124 determines that a GPS position of the client device 102 corresponds to an airport location or is within a predetermined distance of an airport. In such circumstances, the list of activities presented to the user to select from may be limited to those activities associated with an airport (e.g., flying or traveling). As another example, the media template activity platform 124 determines that a GPS position of the client device 102 corresponds to a sporting event venue or is within a predetermined distance of a sporting event venue (e.g., a stadium or arena). In such circumstances, the list of activities presented to the user to select from may be limited to those activities associated with a sporting event venue (e.g., attending a concert or attending a sporting event). In some embodiments, the list may be further filtered or limited based on a time of day or by searching publicly available databases for activities that occur within a predetermined distance of the GPS position and at around the current time. For example, the media template activity platform 124 determines that a concert is scheduled to take place within the next two hours at a location that is within a predetermined distance of a current GPS position of the client device 102. In such circumstances, the list of activities presented to the user to select from may be limited to those activities associated with a concert.

In some embodiments, the activity associated with the user is automatically detected and used to select a corresponding activity template. For example, the media template activity platform 124 accesses one or more sources of information associated with the user (e.g., a user's calendar, an email account of the user, social media messages, text messages, tickets purchased by the user, and so forth). The information obtained from the one or more sources is processed according to various heuristics and machine-learning techniques to determine a likely activity that the user is performing. For example, the media template activity platform 124 detects that the user purchased concert tickets for a given day at a given time. The media template activity platform 124 determines that the current date and time matches the date and time specified by the purchased tickets and accordingly automatically detects that the activity associated with the user is attending a concert. A similar determination may be made by the media template activity platform 124 by processing plane ticket information to detect when the user is performing a travel activity. In implementations, the media template activity platform 124 processes messages exchanged by the user with the user's friends to determine that the user has plans at a certain date and time to go to dinner with those friends. The media template activity platform 124 determines whether the current date and time is within a threshold of the date and time specified in the messages exchanged by the user. If so, the media template activity platform 124 determines whether the user's current GPS location (as determined by a mobile phone or device of the user) is within a threshold distance of a restaurant. If so, the media template activity platform 124 detects that the activity associated with the user is dining out with friends, and accordingly the corresponding activity template is selected automatically (as discussed in later operations). The media template activity platform 124 may also determine whether appointments on the user's calendar identify a given activity or are associated with a given activity. If so, the media template activity platform 124 automatically detects the activity from the user's calendar and selects the corresponding activity template associated with the calendar appointment when the current date and time matches or is within a threshold of the date and time specified by the appointment on the user's calendar.

At operation 402, the media template activity platform 124 identifies a media template associated with the activity, wherein the media template includes a plurality of phase identifiers each associated with a respective phase of the plurality of phases of the activity. For example, the client device 102 provides to the media template activity platform 124 an identifier of the selected activity. The media template activity platform 124 searches the media template(s) 207 to find the media activity template associated with the selected identifier. Once the media template is identified, the media template activity platform 124 retrieves the template and the phase identifiers from the media template(s) 207. The media template activity platform 124 provides the media template including the list of phase identifiers to the client device 102.

Figure 5:
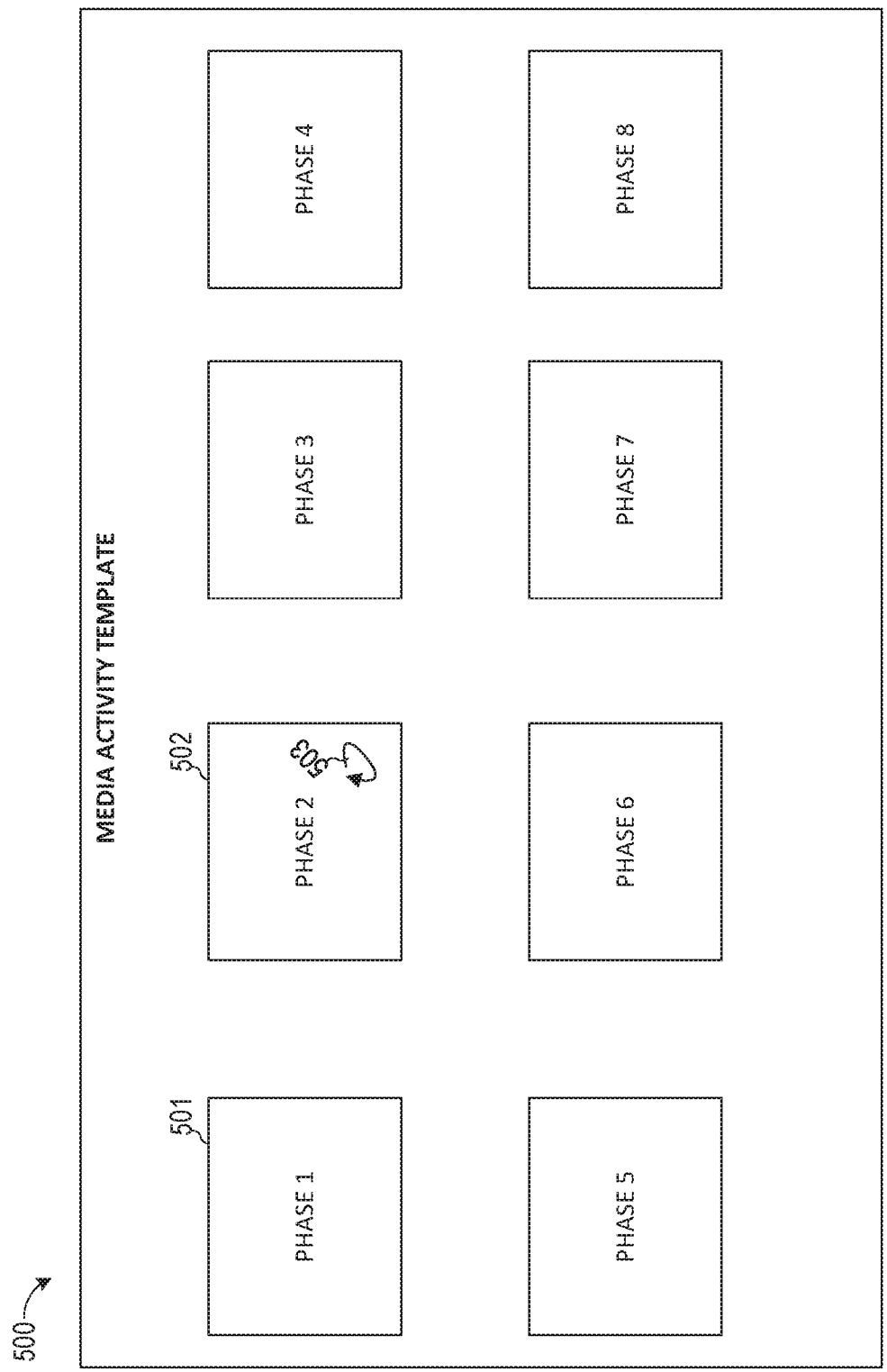
FIGS. 5 and 6 show illustrative media activity templates according to some embodiments.

In some embodiments, the client device 102 presents the retrieved media template to a user. For example, the client device 102 receives a media activity template 500 (FIG. 5) from the media template activity platform 124. The media activity template 500 includes one or more identifiers 501 and 502 of one or more phases of the selected activity. The identifiers 501 and 502 may be presented as placeholder cells and may be interactively selectable. Each identifier 501 and 502 includes a label that textually or visually describes the phase of the activity with which the identifier 501 or 502 is associated.

In some implementations, the identifier 501 is associated with only a single media item (e.g., one image or one video). In some implementations, the identifier 502 is associated with multiple media items (e.g., multiple images or videos). Identifiers 502 that are associated with multiple media items may include an indicator 503 to inform the user that multiple media items can be captured for the specified phase. Identifiers associated with only a single media item may be selected only once, allowing only a single image or video to be captured. Identifiers associated with multiple media items may be selected any number or a predetermined number of times to allow multiple images or videos of the activity phase to be captured. Each time the identifier associated with multiple media items is selected, a new file that includes captured media may be generated based on an image or video captured after the identifier is selected.

Referring back to FIG. 4, at operation 403, the media template activity platform 124 captures a plurality of media items that represents each of the plurality of phases, each media item of the plurality of media items being captured when a corresponding phase of the plurality of phases is in progress. For example, in response to receiving a user selection of the identifier 501, the client device 102 automatically activates an image capture device to enable a user to capture media representing the phase of the activity associated with the selected identifier 501.

For example, the identifier 501 represents a packing phase of a trip. In response to receiving a user selection of the identifier 501, the client device 102 activates a camera of the client device 102. The client device 102 may present a message to the user instructing the user to capture media items (e.g., an image) representing the packing phase of the trip. After the user captures the image of the packing phase, the corresponding identifier 501 is replaced with the captured image. As another example, the identifier 502 represents a travel phase of a trip. In response to receiving a user selection of the identifier 502, the client device 102 activates a camera of the client device 102. The client device 102 may present a message to the user instructing the user to capture media representing the travel phase of the trip (e.g., a picture of the user or selfie on an airplane). After the user captures the image of the travel phase, the corresponding identifier 502 is replaced with the captured image.

Figure 6:
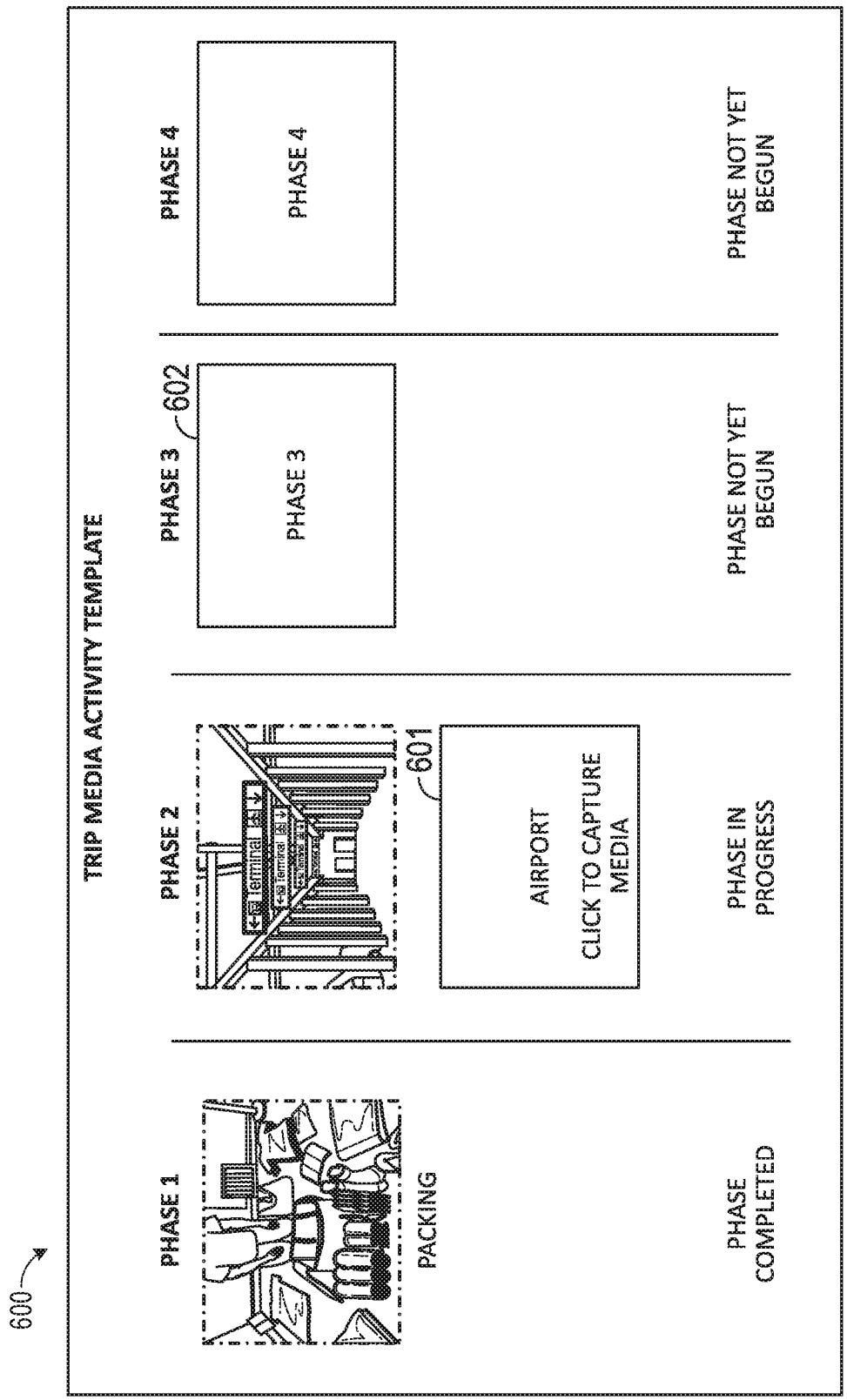

For example, a trip media activity template 600 (FIG. 6) shows various media items representing various phases captured by the client device 102. The image captured by the user after the user selects the packing phase cell is presented in phase 1. The multiple images or videos captured by the user after the user selects the travel phase cell are presented in phase 2. In an implementation, because phase 2 may be associated with multiple media items, an additional empty cell 601 is presented in FIG. 6 that can be selected by the user to capture additional media items representing the second phase. Also, because the first phase is associated with a single media item, no additional empty cells are presented under the first phase, preventing the user from capturing additional media items for the first phase after a given image or video is already captured for the first phase.

In an embodiment, the trip media activity template 600 informs the user of which phases have been completed and which phases have not yet begun. In this way, the user can determine how many more images or videos need to be captured to complete populating the media activity template. A phase may be marked completed after the user selects the placeholder cell or identifier associated with that phase and captures media items representing the phase of the activity. For example, the trip media activity template 600 shows that the second phase is currently in progress, allowing the user to capture additional media items representing the second phase (e.g., by selecting the empty cell 601). After the user selects an identifier 602 of the next phase (e.g., the third phase), the client device 102 may close out the previous phase and mark it as complete or the client device 102 may close out the previous phase after the media items representing the second phase are captured (e.g., so the user does not have to select the identifier 602 of the next phase).

After a phase is marked complete, additional media can no longer be captured, and media subsequently captured is automatically associated with the current phase in progress. The client device 102 changes the third phase indicator to specify "phase in progress" to indicate to the user that media the user captures will be associated with the third phase. In an embodiment, a phase is associated with a single media item. In such cases, after the user selects the identifier of that phase, the phase is marked as in progress. Any image or video captured by the client device 102 is automatically associated with that phase, the phase is automatically marked as complete, and the next adjacent phase is marked as in progress.

In some embodiments, the media template activity platform 124 presents an alert to the user via the client device 102 that identifies the current phase in progress and provides a plurality of options. This may be performed automatically in response to detecting that the user is likely at a next phase of a sequence of phases of an activity. For example, if the user selects a trip activity, the media template activity platform 124 determines that the user is currently home, using the user's stored address and a GPS location determined by the client device 102. In response, the media template activity platform 124 determines that the user is in the packing phase. Accordingly, the media template activity platform 124 presents a message 700 (FIG. 7) that identifies the current phase (e.g., using the first identifier of the trip activity template). The message may inform the user to capture media representing the current phase. As another example, the media template activity platform 124 determines that the user's current location corresponds to or is within a threshold distance of an airport and that the user selected the trip activity template. In response, the media template activity platform 124 marks the current phase as complete and determines that the airport or trip phase of the travel activity has begun. Accordingly, the media template activity platform 124 presents a message 700 identifying that the current phase is a trip phase (e.g., "airport") of the travel activity and providing a number of options.

For example, a capture media option 701 is presented in the message 700. In response to receiving a user selection of the capture media option 701, the media template activity platform 124 activates an image capture device of the client device 102. Any image or video the client device 102 captures in response to being activated is automatically associated and tagged with the phase currently determined to be in progress. For example, an image captured by the device is associated automatically with the trip phase of the travel activity.

A skip phase option 702 in the message 700 allows the user to skip the current phase to capture media for a next phase in the sequence. In response to receiving a user selection of the skip phase option 702, the media template activity platform 124 automatically marks the current phase as complete (even if no images or videos were captured representing the phase) and marks the next phase as in progress. Any media subsequently captured by the client device 102 is automatically associated with the next phase that has been marked as in progress. The previous phase is left empty if no media was captured during that phase.

Referring back to FIG. 4, at operation 404, the media template activity platform 124 associates the plurality of media items with respective phase identifiers of the plurality of phase identifiers of the media template based on the phase corresponding to one of the plurality of phase identifiers.

Figure 7:
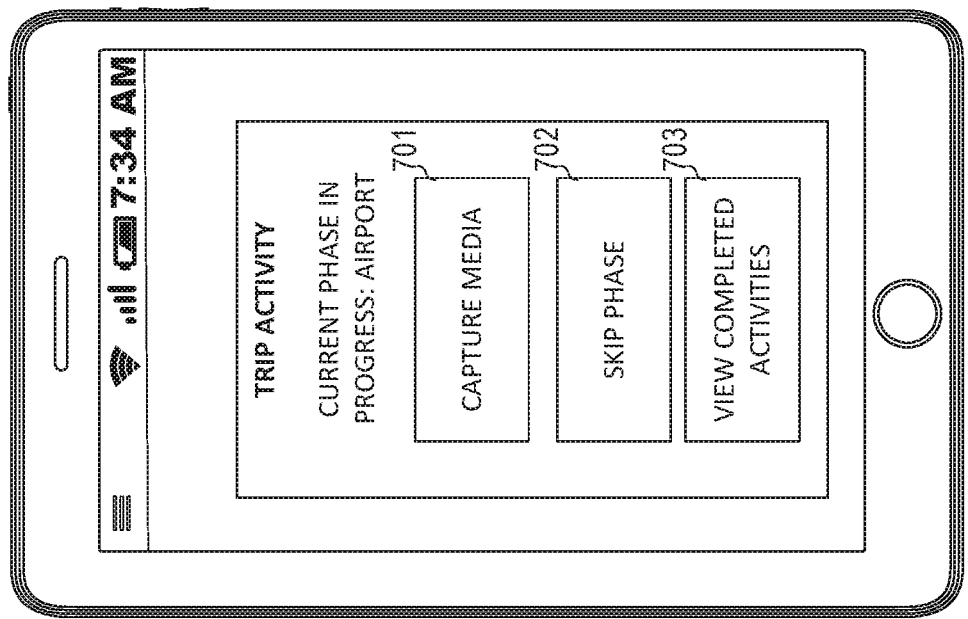
FIG. 7 shows an illustrative media activity prompt according to some embodiments.

At operation 405, the media template activity platform 124 generates a display of the plurality of media items based on the media template that includes the plurality of phase identifiers associated with the plurality of media items. For example, the media template activity platform 124 receives a user selection of a view completed activities option 703 (FIG. 7). In response, the media template activity platform 124 presents a list of all the templates for completed activities 800 (FIG. 8) that have been generated. This list is interactively selectable, allowing the user to choose which of the completed templates to share with another user.

Figure 8:
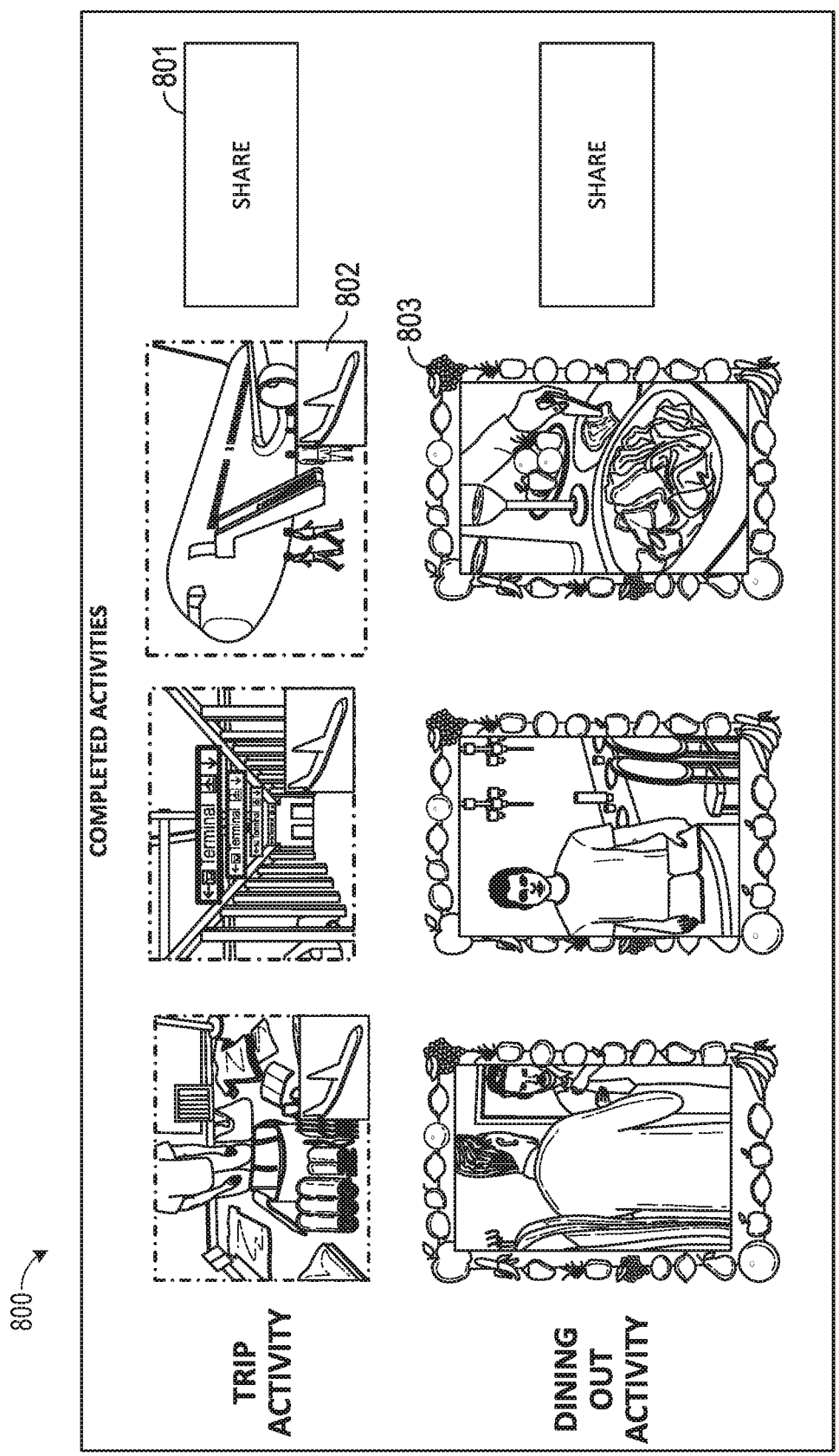
FIG. 8 shows an illustrative set of completed activities according to some embodiments.

FIG. 8 shows an illustrative set of completed activities 800 according to some embodiments. Each completed activity is presented in a different row of the display. A first activity (e.g., a travel activity) includes the set or collection of media captured by the client device 102 while the first activity was being performed by the user. The set or collection of media is presented to the user in the completed activities 800 sequentially according to the sequence of the phases associated with the activity. For example, the first activity is a travel activity, and the set of media that was captured is automatically arranged according to the phases of the travel activity (e.g., first packing, then taking a trip to the airport, and then landing at the destination).

Each of the media items in the first activity is automatically associated with a unique or specific visual element 802 that identifies the first activity. For example, the first activity is a travel activity, and the visual element is an airplane icon. This visual element is integrated into each media item in the first activity by presenting the visual element in the lower right-hand corner of each media item. The visual element may alternatively be positioned outside, next to, or at any other graphical position over the media items in the first activity. A share option 801 may be presented, and in response to the share option 801 being selected, the media associated with the corresponding activity is automatically compiled into an album or story and sent to the user's friends.

As another example, a second activity presented in the list of completed activities 800 corresponds to a dining out activity. The second activity may be associated with a visual element 803 that is different from the visual element 802 associated with the first activity. For example, the visual element 803 is a border that represents food. This border is placed around each media item associated with the second activity. In some implementations, in response to the user selecting the share option 801, the media items and the corresponding visual element 802/803 are sent to the user's friends.

Figure 9:
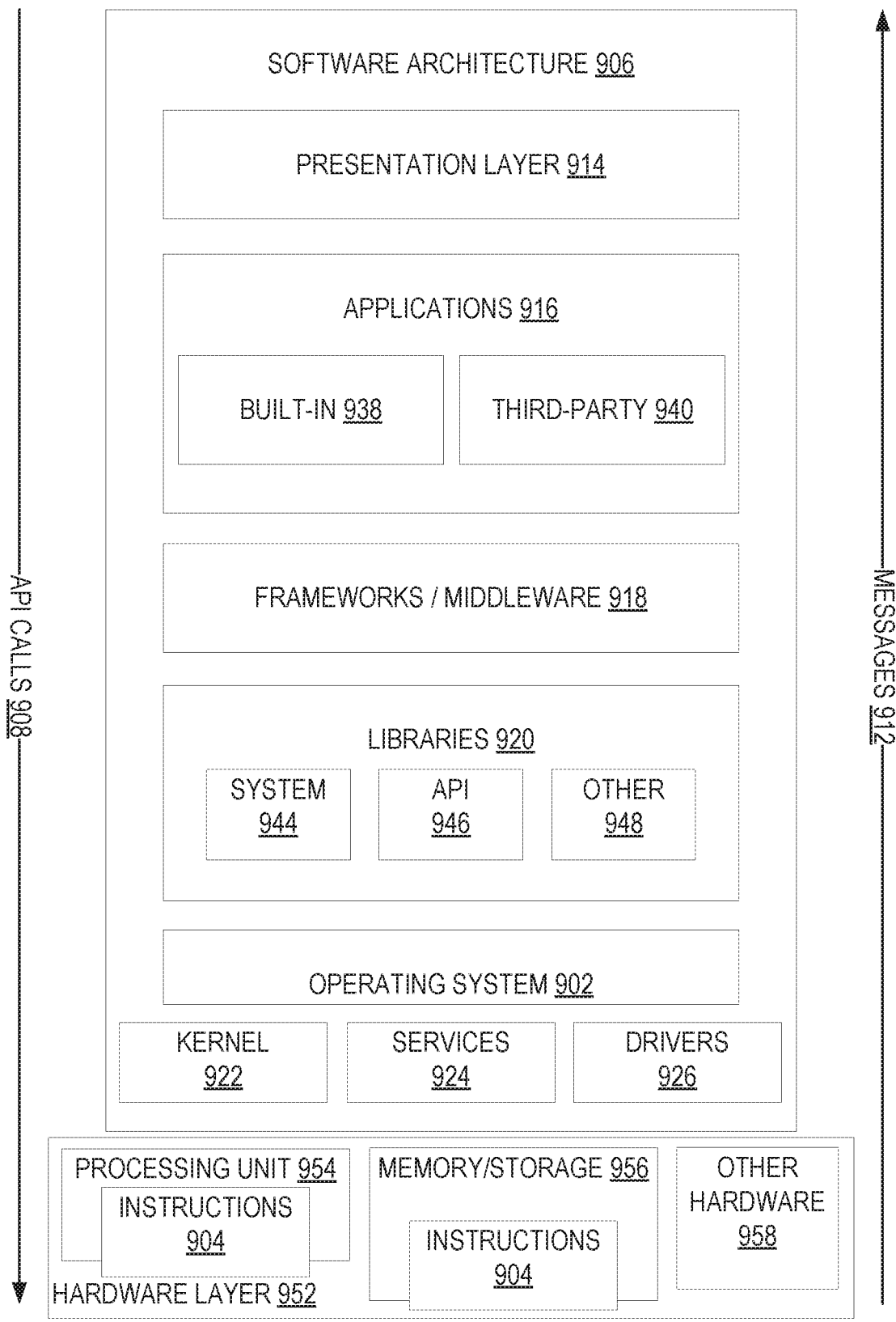
FIG. 9 is a block diagram illustrating a representative software architecture, which may be used in conjunction with various hardware architectures herein described, according to example embodiments.

FIG. 9 is a block diagram illustrating an example software architecture 906, which may be used in conjunction with various hardware architectures herein described. FIG. 9 is a non-limiting example of a software architecture 906, and it will be appreciated that many other architectures may be implemented to facilitate the functionality described herein. The software architecture 906 may execute on hardware such as a machine 1000 of FIG. 10 that includes, among other things, processors 1004, memory 1014, and input/output (I/O) components 1018. A representative hardware layer 952 is illustrated and can represent, for example, the machine 1000 of FIG. 10. The representative hardware layer 952 includes a processing unit 954 having associated executable instructions 904. The executable instructions 904 represent the executable instructions of the software architecture 906, including implementation of the methods, components, and so forth described herein. The hardware layer 952 also includes memory and/or storage modules, indicated as memory/storage 956, which also have the executable instructions 904. The hardware layer 952 may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, frameworks/middleware 918, applications 916, and a presentation layer 914. Operationally, the applications 916 and/or other components within the layers may invoke API calls 908 through the software stack and receive messages 912 in response to the API calls 908. The layers illustrated are representative in nature, and not all software architectures have all layers. For example, some mobile or special-purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 920 provide a common infrastructure that is used by the applications 916 and/or other components and/or layers. The libraries 920 provide functionality that allows other software components to perform tasks in an easier fashion than by interfacing directly with the underlying operating system 902 functionality (e.g., kernel 922, services 924, and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media formats such as MPEG4. H.264, MP3, AAC, AMR, JPG, and PNG), graphics libraries (e.g., an OpenGL framework that may be used to render two-dimensional and three-dimensional graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 provides a higher-level common infrastructure that may be used by the applications 916 and/or other software components/modules. For example, the frameworks/middleware 918 may provide various graphic UI (GUI) functions, high-level resource management, high-level location services, and so forth. The frameworks/middleware 918 may provide a broad spectrum of other APIs that may be utilized by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. The third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as the operating system 902) to facilitate functionality described herein.

The applications 916 may use built-in operating system functions (e.g., kernel 922, services 924, and/or drivers 926), libraries 920, and frameworks/middleware 918 to create UIs to interact with users of the system. Alternatively, or additionally, in some systems, interactions with a user may occur through a presentation layer, such as the presentation layer 914. In these systems, the application/component "logic" can be separated from the aspects of the application/component that interact with a user.

Figure 10:
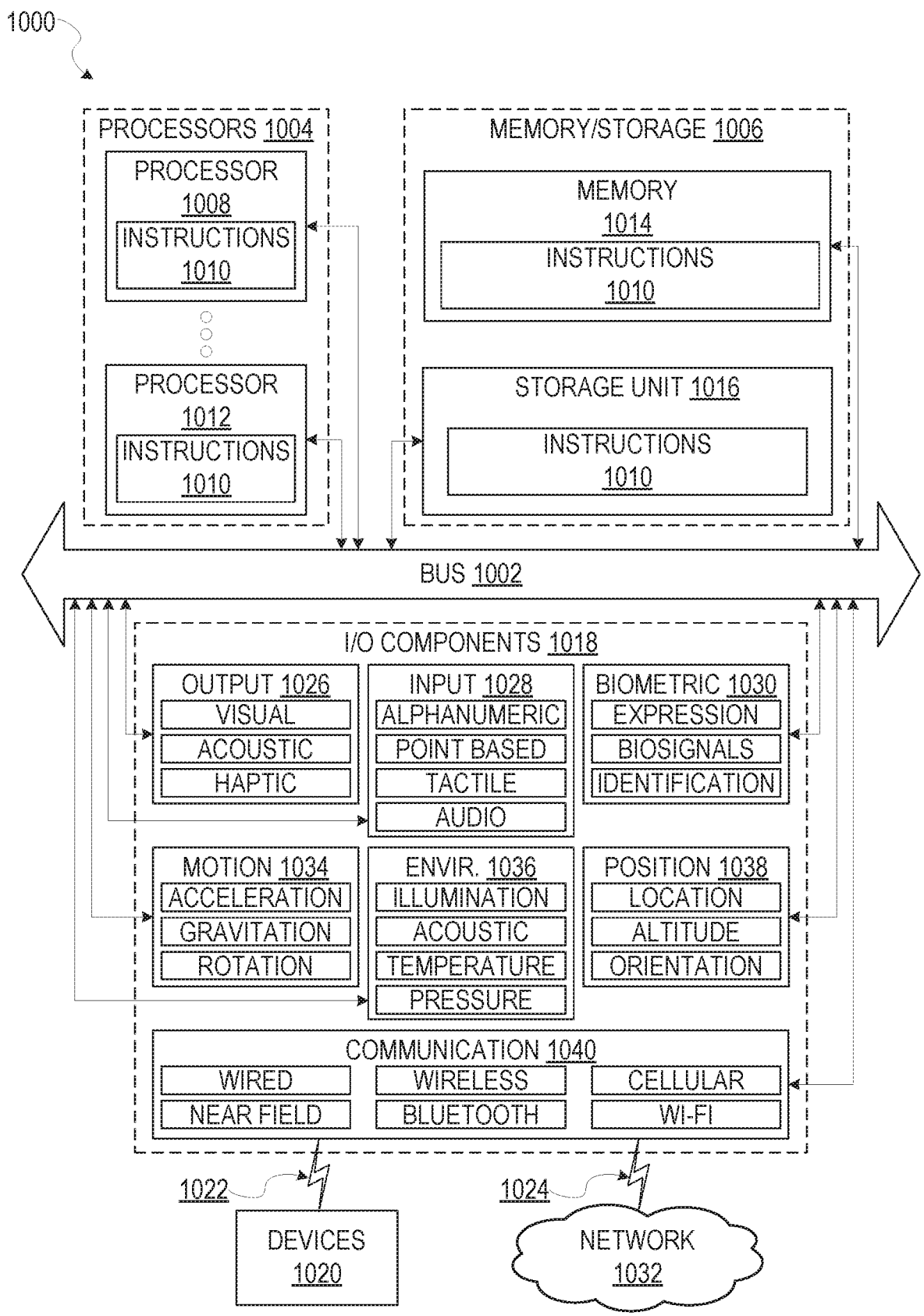
FIG. 10 is a block diagram illustrating components of a machine able to read instructions from a machine-readable medium (e.g., a machine-readable storage medium) and perform any one or more of the methodologies discussed herein, according to example embodiments.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1010, sequentially or otherwise, that specify actions to be taken by the machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory/storage 1006, and I/O components 1018, which may be configured to communicate with each other such as via a bus 1002. In an example embodiment, the processors 1004 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1008 and a processor 1012 that may execute the instructions 1010. The term "processor" is intended to include multi-core processors 1004 that may comprise two or more independent processors (sometimes referred to as "cores") that may execute instructions 1010 contemporaneously. Although FIG. 10 shows multiple processors 1004, the machine 1000 may include a single processor with a single core, a single processor with multiple cores (e.g., a multi-core processor), multiple processors with a single core, multiple processors with multiple cores, or any combination thereof.

The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of the processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion, and the grouping is in no way limiting. In various example embodiments, the I/O components 1018 may include output components 1026 and input components 1028. The output components 1026 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1030, motion components 1034, environmental components 1036, or position components 1038 among a wide array of other components. For example, the biometric components 1030 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1034 may include acceleration sensor components (e.g., accelerometer), gravitation sensor components, rotation sensor components (e.g., gyroscope), and so forth. The environmental components 1036 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 1038 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1032 or devices 1020 via a coupling 1024 and a coupling 1022, respectively. For example, the communication components 1040 may include a network interface component or other suitable device to interface with the network 1032. In further examples, the communication components 1040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1020 may be another machine or any of a wide variety of peripheral devices (e.g., a peripheral device coupled via a USB).

Moreover, the communication components 1040 may detect identifiers or include components operable to detect identifiers. For example, the communication components 1040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code. Data Matrix, Dataglyph, MaxiCode, PDF417. Ultra Code, UCC RSS-2D bar code, and other optical codes), or acoustic detection components (e.g., microphones to identify tagged audio signals). In addition, a variety of information may be derived via the communication components 1040, such as location via Internet Protocol (IP) geolocation, location via Wi-Fi® signal triangulation, location via detecting an NFC beacon signal that may indicate a particular location, and so forth.

Glossary

"CARRIER SIGNAL" in this context refers to any intangible medium that is capable of storing, encoding, or carrying transitory or non-transitory instructions for execution by the machine, and includes digital or analog communications signals or other intangible media to facilitate communication of such instructions. Instructions may be transmitted or received over the network using a transitory or non-transitory transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDA, smart phone, tablet, ultra book, netbook, laptop, multi-processor system, microprocessor-based or programmable consumer electronics system, game console, set-top box, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or another type of cellular or wireless coupling. In this example, the coupling may implement any of a variety of types of data transfer technology, such as Single-Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"EPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device, or other tangible medium able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instant in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instant of time and to constitute a different hardware component at a different instant of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
   detecting, by one or more processors, an activity associated with a user, wherein the activity includes a plurality of sequential phases;
   identifying, by the one or more processors, a media template associated with the activity, wherein the media template includes a plurality of phase identifiers each associated with a respective phase of the plurality of sequential phases of the activity;
   simultaneously visually indicating progress of the plurality of sequential phases of the activity using different visual indicators each representing different phase progress;
   presenting a first identifier for a first phase of the plurality of phases, the first identifier indicating that the first phase is enabled to receive multiple media items;
   presenting a second identifier for a second phase of the plurality of phases, the second identifier indicating that the second phase is enabled to receive only a single media item;
   capturing, by the one or more processors, a plurality of media items that represents the plurality of phases, each media item of the plurality of media items being captured when a corresponding one of the plurality of phases is in progress, the capturing comprising:
      enabling selection of the first identifier multiple times to associate multiple captured media items with the first phase; and
      receiving input that selects the second identifier to associate only one of the plurality of media items with the second phase, wherein, after the second identifier is selected, selection of the second identifier again is prevented;
   associating, by the one or more processors, the plurality of media items with respective phase identifiers of the plurality of phase identifiers of the media template based on the phase associated with each of the plurality of phase identifiers;
   determining that a predetermined quantity of the plurality of phase identifiers are associated with the respective media items; and
   in response to and conditioned upon determining that the predetermined quantity of the plurality of phase identifiers are associated with the respective media items, generating, by the one or more processors, a display of the plurality of media items based on the media template that includes the plurality of phase identifiers associated with the plurality of media items.

2. The method of claim 1, wherein detecting the activity comprises:
   displaying a plurality of activities, each of which has associated therewith a respective one of a plurality of different media templates;

receiving a user selection of the activity from the plurality of activities that is displayed; and in response to receiving the user selection, displaying a first visual indicator, of the different visual indicators, for a first phase of the plurality of phases indicating that the first phase has been completed, displaying a second visual indicator, of the different visual indicators, for a second phase of the plurality of phases indicating that the second phase is in progress, and displaying a third visual indicator, of the different visual indicators, for each of a remaining set of phases that follow the second phase indicating that the remaining set of phases have not yet begun.

3. The method of claim 2 further comprising:

determining a location of the user;

from a predefined set of activities, selecting for display the plurality of activities based on the location of the user;

replacing the second visual indicator for the second phase with the first visual indicator to indicate that the second phase has been completed in response to receiving a user selection, from the generated display, of the identifier associated with a third phase of the plurality of phases that sequentially follows the second phase; and replacing the third visual indicator with the second visual indicator in response to receiving the user selection of the identifier associated with the third phase of the plurality of phases.

4. The method of claim 1, wherein identifying the media template comprises:

determining that an event is scheduled to take place within a threshold period of time at a particular location;

determining that the user is within a predetermined distance of the particular location within the threshold period of time when the event is scheduled to take place;

displaying a list of activities associated with the event in response to determining that the user is within the predetermined distance of the particular location within the threshold period of time when the event is scheduled to take place; and receiving a user selection of the activity from the displayed list of activities.

5. The method of claim 1, wherein identifying the media template comprises:

detecting that the user has purchased tickets to attend an event scheduled to take place on a given day at a given time;

determining that the current date and time matches the given day and given time specified by the purchased ticket; and automatically selecting the activity associated with the event in response to determining that the current date and time matches the given day and given time specified by the purchased ticket.

6. The method of claim 1 further comprising:

as each of the plurality of media items is captured when the corresponding one of the plurality of phases is in progress, incrementing a score associated with the user;

determining that the score associated with the user reaches a predetermined score; and providing a reward to the user in response to determining that the score associated with the user reaches the predetermined score.

7. The method of claim 6, wherein the reward comprises allowing the user to purchase a new avatar or features of the avatar in response to determining that the score associated with the user reaches the predetermined score.

8. The method of claim 1 further comprising:

receiving a first plurality of phase identifiers associated with each phase of the plurality of phases of the activity from a first of a plurality of user devices;

receiving a second plurality of phase identifiers associated with each phase of the plurality of phases of the activity from a second of the plurality of user devices;

receiving a third plurality of phase identifiers associated with each phase of the plurality of phases of the activity from a third of the plurality of user devices;

determining that the first and third plurality of phase identifiers received from the first and third user devices are the same;

in response to determining that the first and third plurality of phase identifiers received from the first and third user devices are the same, determining that a majority of the first, second and third user devices selected a common set of phase identifiers that includes the same first and third plurality of phase identifiers; and selecting the common set of phase identifiers to include in the media template in response to determining that the majority of the first, second and third user devices selected the common set of phase identifiers that includes the same first and third plurality of phase identifiers.

9. The method of claim 1 further comprising:

processing messages exchanged by the user with friends of the user to determine that the user has plans to attend an event at a given date and time;

determining that the current date and time is within a threshold of the date and time specified by the messages exchanged by the user with friends of the user;

in response to determining that the current date and time is within the threshold of the date and time specified by the messages exchanged by the user with friends of the user, determining that a current location of the user is within a threshold distance of a location of the event; and in response to determining that the current location of the user is within the threshold distance of the location of the event, determined from the messages exchanged by the user with friends of the user, automatically selecting the activity associated with the event.

10. The method of claim 9 further comprising:

determining that a first phase of the plurality of phases is currently in progress; and generating a prompt for display on a device associated with the user that identifies the first phase and a first phase identifier of the plurality of phase identifiers associated with the first phase, wherein the prompt requests the user to capture a first media item associated with the first phase.

11. The method of claim 1, in response to that a first phase of the plurality of phases is currently in progress, generating a prompt for display on a device associated with the user that identifies the first phase and a first phase identifier of the plurality of phase identifiers associated with the first phase, wherein the prompt requests the user to capture a first media item associated with the first phase, wherein the prompt indicates progress through the plurality of sequential phases including an indication of a remaining set of phases associated with the activity, wherein the prompt includes a first option to skip capturing media items associated with the first phase and to advance to a next phase of the plurality of phases, and wherein the prompt includes a second option to activate an image capture device to capture the first media item.

12. The method of claim 9 further comprising:
   displaying a grid including a plurality of cells each associated with a different one of the plurality of phase identifiers, each cell including a label indicating the phase identifier associated with the cell; and
   while the user performs the first phase of the plurality of phases, receiving, from a user device associated with the user, a selection of a given cell in the grid associated with a first phase identifier.

13. The method of claim 12, wherein the plurality of cells is arranged in a sequence corresponding to a sequence of the plurality of sequential phases.

14. The method of claim 12 further comprising capturing a first media item associated with the first phase, wherein associating the plurality of media items comprises populating the selected given cell with the captured first media item.

15. The method of claim 1, wherein a first phase identifier of the plurality of phase identifiers is associated with a single media item of the plurality of media items, and wherein a second phase identifier of the plurality of phase identifiers is associated with multiple media items of the plurality of media items.

16. The method of claim 1, wherein the activity is a first activity, further comprising:
   retrieving a plurality of completed activities, each of the plurality of completed activities comprising a collection of media items captured while the respective completed activity was being performed, wherein the first activity is added to the plurality of completed activities after the plurality of phases of the first activity is completed;
   displaying the collection of media items associated with the first of the plurality of completed activities on a first portion of a display;
   displaying the collection of media items associated with the second of the plurality of completed activities on a second portion of a display;
   graphically augmenting the collection of media items associated with the first of the plurality of completed activities with a first visual element that represents a first type of the first of the plurality of completed activities, the graphically augmenting the collection of media items associated with the first of the plurality of completed activities comprises placing a same border that represents the first type of the first of the plurality of completed activities around first and second media items in the collection of media items associated with the first of the plurality of completed activities; and
   graphically augmenting the collection of media items associated with the second of the plurality of completed activities with a second visual element that represents a second type of the second of the plurality of completed activities.

17. The method of claim 16, further comprising displaying a first share option in the first portion of the display to transmit the collection of media items associated with the first of the plurality of completed activities to one or more friends of the user.

18. A system comprising:
   a processor configured to perform operations comprising:
   detecting an activity associated with a user, wherein the activity includes a plurality of sequential phases;
   identifying a media template associated with the activity, wherein the media template includes a plurality of phase identifiers each associated with a respective phase of the plurality of sequential phases of the activity;
   simultaneously visually indicating current progress of the plurality of sequential phases of the activity using different visual indicators each representing different phase progress;
   presenting a first identifier for a first phase of the plurality of phases, the first identifier indicating that the first phase is enabled to receive multiple media items;
   presenting a second identifier for a second phase of the plurality of phases, the second identifier indicating that the second phase is enabled to receive only a single media item;
   capturing a plurality of media items that represents the plurality of phases, each media item of the plurality of media items being captured when a corresponding one of the plurality of phases is in progress, the capturing comprising:
      enabling selection of the first identifier multiple times to associate multiple captured media items with the first phase; and
      receiving input that selects the second identifier to associate only one of the plurality of media items with the second phase, wherein, after the second identifier is selected, selection of the second identifier again is prevented;
   associating the plurality of media items with respective phase identifiers of the plurality of phase identifiers of the media template based on the phase associated with each of the plurality of phase identifiers; and
   determining that a predetermined quantity of the plurality of phase identifiers are associated with the respective media items; and
   in response to and conditioned upon determining that the predetermined quantity of the plurality of phase identifiers are associated with the respective media items, generating a display of the plurality of media items based on the media template that includes the plurality of phase identifiers associated with the plurality of media items.

19. The system of claim 18, wherein the operations include:
   identifying a visual element associated with the detected activity; and
   applying the visual element to each of the plurality of media items that is associated with the phase identifiers of the media template.

20. A non-transitory machine-readable storage medium that includes instructions that, when executed by one or more processors of a machine, cause the machine to perform operations comprising:
   detecting an activity associated with a user, wherein the activity includes a plurality of sequential phases;
   identifying a media template associated with the activity, wherein the media template includes a plurality of phase identifiers each associated with a respective phase of the plurality of sequential phases of the activity;
   simultaneously visually indicating current progress of the plurality of sequential phases of the activity using different visual indicators each representing different phase progress;
   presenting a first identifier for a first phase of the plurality of phases, the first identifier indicating that the first phase is enabled to receive multiple media items;

presenting a second identifier for a second phase of the plurality of phases, the second identifier indicating that the second phase is enabled to receive only a single media item;

capturing a plurality of media items that represents the plurality of phases, each media item of the plurality of media items being captured when a corresponding one of the plurality of phases is in progress, the capturing comprising:

enabling selection of the first identifier multiple times to associate multiple captured media items with the first phase; and receiving input that selects the second identifier to associate only one of the plurality of media items with the second phase, wherein, after the second identifier is selected, selection of the second identifier again is prevented;

associating the plurality of media items with respective phase identifiers of the plurality of phase identifiers of the media template based on the phase associated with each of the plurality of phase identifiers; and determining that a predetermined quantity of the plurality of phase identifiers are associated with the respective media items; and in response to and conditioned upon determining that the predetermined quantity of the plurality of phase identifiers are associated with the respective media items, generating a display of the plurality of media items based on the media template that includes the plurality of phase identifiers associated with the plurality of media items.

* * * * *